United States Patent
Kristiansen

(10) Patent No.: US 10,288,225 B2
(45) Date of Patent: May 14, 2019

(54) PIPELINE SYSTEM

(71) Applicant: Siemens Aktiengesellschaft, Munich (DE)

(72) Inventor: Karstein Kristiansen, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/320,892

(22) PCT Filed: May 13, 2015

(86) PCT No.: PCT/EP2015/060546
§ 371 (c)(1),
(2) Date: Dec. 21, 2016

(87) PCT Pub. No.: WO2016/008611
PCT Pub. Date: Jan. 21, 2016

(65) Prior Publication Data
US 2017/0198865 A1 Jul. 13, 2017

(30) Foreign Application Priority Data
Jul. 15, 2014 (EP) .................................. 14177115

(51) Int. Cl.
*F17D 3/01* (2006.01)
*F16L 58/02* (2006.01)
(Continued)

(52) U.S. Cl.
CPC ................ *F17D 3/01* (2013.01); *E21B 44/06* (2013.01); *F16L 53/34* (2018.01); *F16L 58/02* (2013.01);
(Continued)

(58) Field of Classification Search
CPC ........................................................ F17D 3/01
See application file for complete search history.

(56) References Cited

U.S. PATENT DOCUMENTS

| 2003/0107483 | A1* | 6/2003 | Kano | ........................ | G01D 1/18 |
| | | | | | 340/540 |
| 2004/0113790 | A1* | 6/2004 | Hamel | .................. | A61F 2/4657 |
| | | | | | 340/572.1 |

(Continued)

FOREIGN PATENT DOCUMENTS

| DE | 10-2008-056087 A1 | 5/2010 | |
| DE | 102008056087 A1 * | 5/2010 | ............. E21B 47/06 |

(Continued)

OTHER PUBLICATIONS

Bosselmann, DE102008056087 w translation, Espacenet, May 2010.*

(Continued)

*Primary Examiner* — Eric S. McCall
*Assistant Examiner* — Timothy P Graves
(74) *Attorney, Agent, or Firm* — Harness, Dickey & Pierce, P.L.C.

(57) ABSTRACT

A pipeline system includes a pipeline portion; at least one sensor on the pipeline portion for measuring a physical property of the pipeline portion or of a fluid inside the pipeline portion; and an electromagnetic field source distributed along the pipeline portion and creating an electromagnetic field around the pipeline portion, the at least one sensor including an accumulator for storing an electric charge induced in the accumulator when the sensor is subject to the electromagnetic field created by the electromagnetic field source, the accumulator being able to power the at least one sensor by way of the stored electric charge.

10 Claims, 1 Drawing Sheet

(51) Int. Cl.
*F17D 1/18* (2006.01)
*E21B 44/06* (2006.01)
*F16L 53/34* (2018.01)
*F17D 3/18* (2006.01)
*H05B 6/02* (2006.01)
*G01D 5/26* (2006.01)
*E21B 47/00* (2012.01)
*G01K 11/32* (2006.01)
*F17D 1/16* (2006.01)

(52) U.S. Cl.
CPC ............... *F17D 1/18* (2013.01); *F17D 3/18* (2013.01); *E21B 47/00* (2013.01); *F17D 1/16* (2013.01); *G01D 5/268* (2013.01); *G01K 11/32* (2013.01); *G01K 11/3206* (2013.01); *H05B 6/02* (2013.01)

(56) References Cited

U.S. PATENT DOCUMENTS

| | | |
|---|---|---|
| 2005/0283276 A1 | 12/2005 | Prescott et al. |
| 2007/0169574 A1 | 7/2007 | Hedtke et al. |
| 2008/0184795 A1* | 8/2008 | Woodard ........... G01R 33/1223 73/304 C |
| 2008/0314451 A1 | 12/2008 | Matos |
| 2009/0107558 A1* | 4/2009 | Quigley .................. F16L 11/12 137/15.01 |
| 2010/0109331 A1 | 5/2010 | Hedtke et al. |
| 2011/0024655 A1 | 2/2011 | Goodson |
| 2011/0248019 A1 | 10/2011 | Chew |

FOREIGN PATENT DOCUMENTS

| | | |
|---|---|---|
| EP | 0887691 A2 | 12/1998 |
| WO | WO-2005/119390 A2 | 12/2005 |
| WO | WO-2010/069110 A1 | 6/2010 |

OTHER PUBLICATIONS

International Search Report PCT/ISA/210 for International Application No. PCT/EP2015/060546 dated Oct. 2, 2015.
Written Opinion of the International Searching Authority PCT/ISA/237 for International Application No. PCT/EP2015/060546 dated Oct. 2, 2015.
Office Action for European Patent Application No. 15725260.2 dated Nov. 2, 2017.

* cited by examiner

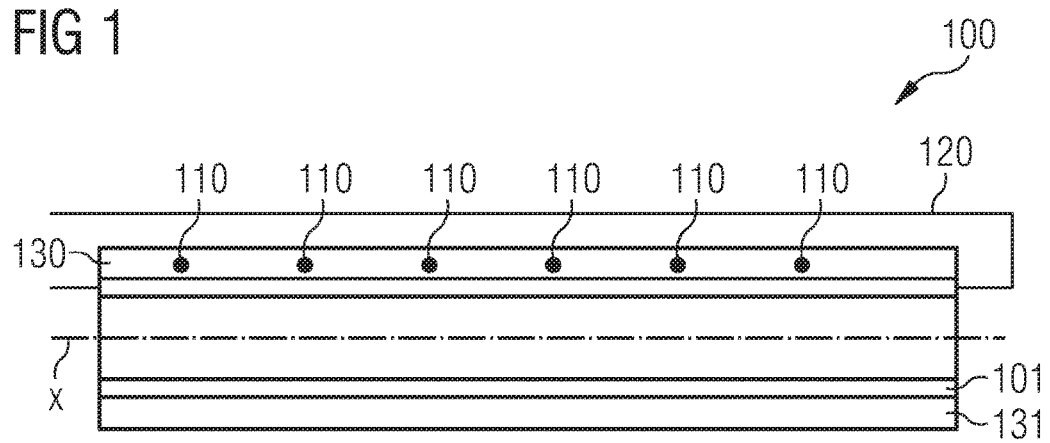
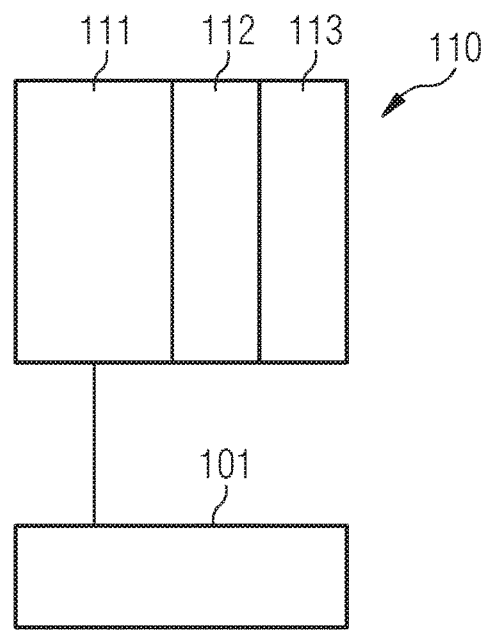

PIPELINE SYSTEM

PRIORITY STATEMENT

This application is the national phase under 35 U.S.C. § 371 of PCT International Application No. PCT/EP2015/060546 which has an International filing date of May 13, 2015, which designated the United States of America and which claims priority to European patent application number EP14177115.4 filed Jul. 15, 2014, the entire contents of which are hereby incorporated herein by reference.

FIELD

At least one embodiment of the present invention relates to a pipeline system, in particular a pipeline system including at least a pipeline portion with a plurality of sensors.

BACKGROUND

In the field of offshore oil and/or gas production pipeline systems are normally used. In particular, at offshore oilfields, subsea pipelines are used to transport the multiphase mixture of oil, gas and water from producing wells to the processing facilities on the land. Several kilometers of pipeline run on the seabed for this purpose.

The pipeline is provided with a coating for isolating the pipeline from the contact with sea water, in order to prevent corrosion.

Along the pipeline a plurality of sensors are normally installed inside the coating of the pipeline, for remotely monitoring the conditions of the pipeline itself and promptly detect any damage or problem. For example, PH sensors may be provided for indirect measurement of corrosion or pressure sensors for monitoring any excessive pressure drop along the pipeline which may be due to a leak. Mass flow rate sensors may also be installed for detecting leaks. In any case, sensors have normally to be installed in contact with the pipeline, i.e. inside the pipeline coating, in order to properly function.

The sensors distributed along the pipeline needs power to do the provided measurements and communicate the results along the pipeline. The battery packages are placed outside the coating of the pipeline. This will assure that batteries could be changed, for example when exhausted, without removing any part of the coating. Battery packages cannot be mounted on the pipeline before reeling, due to the diameter on the reels used for storage of pipeline. The reels needs pipeline with uniform diameter and the presence of battery packages would violate these requirements. Therefore, but battery packages have to be mounted on the pipeline as the last job before the pipeline is installed. This job is normally done on the vessel which installs the pipeline in a subsea installation, thus making the installation process longer.

Another drawback is the fact that, even if these batteries can last for 20-25 years, they are nevertheless subject to run off of charge, needing the exhausted battery to be replaced with a new one. The maintenance operation for replacing the battery in a subsea environment may be a difficult operation, in any case involving time and costs to be performed.

In addition, an electrical connection has to exist between the batteries and the electronics/sensors which are present inside the coating. This means that, when installing the sensors on the pipeline, an electrical connection has to be provided for each sensor. The electrical connection has to pass through the coating, in order to connect it, during the later installation phase, with the battery package providing power. The connection between the electronic inside the coating on the pipeline and the battery package is a weak point in the assembly for each sensor node distributed along the pipeline, for example a point through which sea water can reach the pipeline.

A further drawback of the presence of the battery packages outside the pipeline is the fact that the distributed battery packages increases the diameter of the pipeline but only on some spots, i.e. the spots where a sensor is present, giving a lesser smooth pipeline which makes the piping installation process more complicated.

A possible solution for avoiding the use a battery package in a subsea device is described in DE 10 2008 056087, where the use of optical fibres guided on a pipeline for the purpose of measuring temperature and/or pressure is described. The optical fibres comprise individual sensors on the pipeline in a decentralized manner and can be supplied by an external underwater Bragg unit to which an accumulator is associated. Such accumulator receives energy from an inductive converter inductively couple to an electrical underwater cable.

SUMMARY

The inventors have discovered that such a solution is not optimal because an electrical connection must be established between any accumulator used and at least one inductive converter, which has to be proximal to the electrical underwater cable.

At least one embodiment of the invention provides a pipeline system which overcomes at least part of the above and/or other drawbacks.

At least one embodiment of the present invention is directed to a pipeline including a plurality of sensors which can be mounted on the pipeline during reeling, with no need of further operation for assuring the sensor electrical powering, to be performed immediately before the pipeline installation.

According to a first embodiment of the present invention a pipeline system comprising:
a pipeline portion,
at least one sensor on the pipeline portion for measuring a physical property of the pipeline portion or of a fluid inside the pipeline portion, and
an electromagnetic field source distributed along the pipeline portion and creating an electromagnetic field around the pipeline portion,
wherein the sensor includes an accumulator for storing an electric charge induced in the accumulator when the sensor is subject to the electromagnetic field created by the electromagnetic field source, the accumulator being able to power the sensor by way of the stored electric charge.

According to a second embodiment of the present invention, a sensor for making measurements along a pipeline system including an accumulator for storing an electric charge when subject to an electromagnetic field created by an electromagnetic field source included in the pipeline system.

BRIEF DESCRIPTION OF THE DRAWINGS

The aspects defined above and further aspects of the present invention are apparent from the examples of embodiment to be described hereinafter and are explained with reference to the examples of embodiment. The inven- FIG. 1 shows a schematic view of a pipeline system according to an embodiment of the present invention, FIG. 2 shows a schematic block view of a sensor for a pipeline system according to an embodiment of the present invention.

DETAILED DESCRIPTION OF THE EXAMPLE EMBODIMENTS

At least one embodiment of the present invention is directed to a pipeline including a plurality of sensors which can be mounted on the pipeline during reeling, with no need of further operation for assuring the sensor electrical powering, to be performed immediately before the pipeline installation.

At least one embodiment of the present invention provides a pipeline including a plurality of sensors and an external coating with a smooth surface along all its length, without any clumsy elements on the outside, in particular clumsy element constituted by battery packages for the sensor powering. A smooth surface makes the pipeline installation process easier, with respect to known pipelines.

At least one embodiment of the present invention is directed to a pipeline including a plurality of sensors, wherein maintenance times and costs are reduced, with respect to known pipelines.

At least one embodiment of the present invention is directed to a pipeline including a plurality of sensors which does not require a plurality of wires or other electrical connection passing through the coating layer, for connecting the sensors to a respective power sources, thus improving the pipeline reliability.

In at least one embodiment, a pipeline system and a sensor for pipeline measurements in a pipeline are provided. The claims describe advantageous developments and modifications of the invention.

According to a first embodiment of the present invention a pipeline system comprising:
a pipeline portion,
at least one sensor on the pipeline portion for measuring a physical property of the pipeline portion or of a fluid inside the pipeline portion, and
an electromagnetic field source distributed along the pipeline portion and creating an electromagnetic field around the pipeline portion,
wherein the sensor includes an accumulator for storing an electric charge induced in the accumulator when the sensor is subject to the electromagnetic field created by the electromagnetic field source, the accumulator being able to power the sensor by way of the stored electric charge.

The fluid inside the pipeline typically comprises a liquid, for example oil, or a gas, for example natural gas.

Advantageously, in at least one embodiment of the present invention, the battery and the electrical connections between the battery and sensor of the prior art pipelines are replaced by a sensor including an accumulator capable of storing an electrical charge when immersed in an electromagnetic field created around the pipeline by an electromagnetic field source.

According to an example embodiment of the present invention, the electromagnetic field source includes an electrical heating device for heating the pipeline portion. Pipelines are typically provided with Direct Electrical Heating (DEH). The oil and or gas products inside the pipeline normally exit from a well at high temperature and pressure, but must be kept warm along the pipeline, in order to avoid the formation of plugs. This may become critical particularly during production shut-downs. Being a pipeline typical length in the order of several kilometers the electrical current passing in the DEH system is normally high and the electromagnetic field generated is proportional to this current. Advantageously, according to at least one embodiment of the present invention, such strong electromagnetic field cannot also be used for providing an electrical charge to the sensors installed along the pipeline.

According to an example embodiment of the present invention, the accumulator powers the sensor via the stored electric charge when the electromagnetic field source is switched off.

Advantageously, this allows the sensors to transfer data without being disturbed by the strong electromagnetic field which is normally generated by a DEH system.

At least one embodiment of the present invention allows a pipeline system to be externally smooth, the sensor and their powering device(s) being completely internal to the cover layer which provide the external surface of the pipeline. This makes the handling of the pipeline particular easy and practical, particularly during installation.

According to a second embodiment of the present invention, a sensor for making measurements along a pipeline system including an accumulator for storing an electric charge when subject to an electromagnetic field created by an electromagnetic field source included in the pipeline system.

The same advantages mentioned with reference to the first embodiment of the present invention can be achieved also by the second embodiment of the invention.

FIG. 1 shows a pipeline system 100 according to an embodiment of the present invention.

The pipeline system 100 include a metallic pipeline portion 101 extending along a longitudinal axis X, which may be used in a subsea installation for connecting a well in an offshore oil and/or gas extraction field to an inshore processing facility, for example a refinery.

According to different embodiments of the present invention, the pipeline portion 101 may coincide with an entire subsea pipeline, extending on the seabed from a well to an inshore processing facility, or it may be only a part of it.

The pipeline system 100 further includes a coating 130 for protecting the pipeline portion 101 from the contact with the sea water, which generates corrosions. Processes and materials used in the coating process are conventional and known in the art and for this reason not describes in further detail. The coating provides an external smooth cylindrical surface 131 to the pipeline portion 101.

The pipeline system 100 further includes a plurality of sensors 110, in contact with the pipeline portion 101 and installed in such a way to be completely covered by the coating 130, i.e. the sensors are comprised between the pipeline portion 101 and the external surface 131 of the coating.

Sensors typically used along a pipeline installation are:
electrical or electrochemical sensors for corrosion detection,
PH sensors for indirect corrosion detection,
pressure sensors for monitoring pressure drops along the pipeline portion 101 and possibly detect leaks through excessive pressure drop detection,
mass flow rate sensors, for monitoring the quantity of oil and/or gas transferred along the pipeline and detect leaks, temperature sensor, for controlling that oil and/or gas inside the pipeline are above a desired level, in order to avoid plug formation, strain gauges for measuring mechanical displacement of the pipeline during its lifetime, gravity sensors, for identifying the rotation of the pipeline, immediately after installation, and during the lifetime of the pipeline, and/or other sensors.

With reference to FIG. 2, each sensor 110 includes a probe 111 for the measurement of a respective physical property, for example PH or pressure or temperature. The probe is directly connected to the pipeline portion 101 for the measurement of the respective physical property. Each sensor 110 also includes an electronic circuit 112 for receiving and transmitting the measured property to a control and monitoring centre, which may be either offshore or inshore, and an accumulator 113 for storing an electrical charge which is subject to form on the accumulator 113 when the accumulator 113 is immersed in an electromagnetic field. According to the present invention, the accumulator 113 may be of any type, for example a capacitive accumulator having two conductor elements separated by a dielectric. When subject to an electromagnetic field, electrical charges of opposite sign are subject to form on the two conductor elements of the accumulator 113.

The pipeline system 100 includes also a Direct Electric Heating (DEH) which comprises a metallic cable 120 (normally referred to as "piggyback" cable) connected to the metallic wall of the pipeline portion 101. The current, flowing in the cable 120 and in the pipeline wall, transfers heat to pipeline and through the pipeline to the oil and/or gas products inside the pipeline, which can be therefore kept above a desired temperature, thus avoiding plug formation.

The metallic cable 120 is also an electromagnetic field source creating an electromagnetic field in which the sensors 110 are immersed. In fact, the current circulating flowing in the cable 120 and in the pipeline wall creates an electromagnetic field around the pipeline, to which the accumulator 113 is sensitive. Therefore, when the metallic cable 120 is switched on for heating the pipeline, thus preventing the formation of plugs along it, it also induces an electrical charge in the accumulator 113. The value of the current circulating in the metallic cable 120 is enough to assure both the functions of heating the pipeline portion 101 and of electrically charging the accumulator 113.

For a typical pipeline having a length in the order of 10 km a typical value of the current in the metallic cable 120 is from 800 to 2000 A. The charge in the accumulator 113 is such to assure typically a power of 2 to 3 W for each sensor 110, at a voltage comprised between 5 and 10 V.

The metallic cable 120 providing the electromagnetic field source for the charging of each accumulator 113 can be periodically switched off without prejudicing its function of heating the pipeline portion 101 and preventing plug formation, thanks to the thermal inertia of the pipeline portion and to the coating 130, which prevents heating power to be lost towards the external environment. The time intervals during which the metallic cable 120 is switched off are conveniently used by the plurality of sensors 110 transmitting the respective measured physical properties to the control and monitoring centre. The data transmission will not be disturbed by the electromagnetic field of the metallic cable 120. This also means that no screens have to be provided between the electromagnetic field around the pipeline and the sensors as they would be useless during transmissions and they would also negatively influence the charging of the accumulator 113. During data transmission, the sensors 110 are powered by the electric charge previously stored in the respective accumulators 113. The electric charge in the accumulators 113 is sufficient to assure an effective communications of the respective measured physical properties. Re-charging of the accumulators 113 will occur when the metallic cable 120 is again switched on.

Therefore, the sensor 110 can properly function without conventional batteries, using the energy stored in the accumulator 113, only for the period necessary to transmit measured data.

The invention claimed is:

1. A pipeline system, comprising:
   a pipeline portion;
   at least one sensor on the pipeline portion, to measure a physical property of the pipeline portion or of a fluid inside the pipeline portion; and
   an electrical heating device distributed along the pipeline portion to heat the pipeline portion, the electrical heating device creating an electromagnetic field around the pipeline portion, wherein the at least one sensor includes an accumulator therein and configured to store an electric charge induced in the accumulator when the at least one sensor is subject to the electromagnetic field created by the electrical heating device, the accumulator being further configured to power the at least one sensor by way of the stored electric charge.

2. The pipeline system of claim 1, further comprising:
   a coating around the pipeline portion, the coating providing an external surface to the pipeline portion, the at least one sensor including a plurality of sensors and the plurality of sensors being comprised between the pipeline portion and external surface, wherein the electrical heating device includes a metallic cable connected to a metallic wall of the pipeline portion, the metallic cable being external to the external surface of the pipeline portion.

3. The pipeline system of claim 1, wherein the accumulator is configured to power the at least one sensor by way of the stored electric charge when the electrical heating device is switched off.

4. The pipeline system of claim 2, wherein the accumulator is configured to power the at least one sensor by way of the stored electric charge when the electrical heating device is switched off.

5. The pipeline system of claim 2, further comprising:
   a coating around the pipeline portion, the coating providing an external surface to the pipeline portion, the at least one sensor including a plurality of sensors and the plurality of sensors being comprised between the pipeline portion and external surface.

6. The pipeline system of claim 3, further comprising:
   a coating around the pipeline portion, the coating providing an external surface to the pipeline portion, the at least one sensor including a plurality of sensors and the plurality of sensors being comprised between the pipeline portion and external surface.

7. The pipeline system of claim 4, further comprising:
   a coating around the pipeline portion, the coating providing an external surface to the pipeline portion, the at least one sensor including a plurality of sensors and the plurality of sensors being comprised between the pipeline portion and external surface.

8. A sensor for making measurements on a pipeline system, the sensor comprising:
   an accumulator within the sensor, the accumulator being configured to store an electric charge when subject to an electromagnetic field created by an electrical heating device included in the pipeline system.

9. The sensor of claim 8, wherein the sensor is one selected from the group consisting of pressure sensor, PH sensor, mass flow rate sensor, strain gauge, gravity sensor.

10. The sensor of claim 8, further comprising a coating, wherein the sensor and the accumulator are embedded in the coating.

* * * * *